(12) United States Patent
Li

(10) Patent No.: US 8,843,897 B2
(45) Date of Patent: Sep. 23, 2014

(54) SYSTEM AND METHOD FOR USING AN ABSTRACT SYNTAX TREE TO ENCAPSULATE THE DESCRIPTIVE ASSERTIONS IN AN ANNOTATION BASED STANDARD INTO A CODE BASED LIBRARY

(75) Inventor: Haijun Li, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 13/564,602

(22) Filed: Aug. 1, 2012

(65) Prior Publication Data

US 2014/0040865 A1 Feb. 6, 2014

(51) Int. Cl.
*G06F 9/44* (2006.01)

(52) U.S. Cl.
CPC ........................................ *G06F 8/75* (2013.01)
USPC ......................................................... 717/126

(58) Field of Classification Search
CPC ......................................................... G06F 8/75
USPC ......................................................... 717/126
See application file for complete search history.

(56) References Cited

U.S. PATENT DOCUMENTS

| | | | |
|---|---|---|---|
| 6,353,925 B1 * | 3/2002 | Stata et al. | 717/112 |
| 7,281,237 B2 | 10/2007 | de Jong | |
| 8,495,567 B2 | 7/2013 | Bak et al. | |
| 2004/0143814 A1 * | 7/2004 | de Jong | 717/104 |
| 2006/0294502 A1 * | 12/2006 | Das et al. | 717/129 |
| 2012/0047489 A1 | 2/2012 | Varadharajan | |
| 2012/0159446 A1 | 6/2012 | Jentsch et al. | |
| 2012/0254830 A1 * | 10/2012 | Conrad et al. | 717/106 |
| 2013/0339930 A1 * | 12/2013 | Xu | 717/125 |

OTHER PUBLICATIONS

"Writing JUnit Tests in NetBeans IDE"; netbeans.org website as captured by the Wayback Machine Internet Archive (archive.org) on Nov. 27, 2010.*
"A method and mechanism of unit testing using structured annotations in programming language"; an IP.com Prior Art Database Technical Disclosure; Apr. 27, 2012.*

* cited by examiner

*Primary Examiner* — Qing Chen
*Assistant Examiner* — Clint A Thatcher
(74) *Attorney, Agent, or Firm* — Meyer IP Law Group

(57) ABSTRACT

A system and method can support compliance tests with annotation based standards using an expectation library. The expectation library can convert one or more descriptive assertions into a structured data model, wherein the one or more descriptive assertions describe one or more annotations. Furthermore, the expectation library can parse a source file that contains the one or more annotations based on the structured data model. Additionally, the expectation library can obtain information related to the one or more annotations of the source file from the structured data model.

20 Claims, 4 Drawing Sheets

US 8,843,897 B2

SYSTEM AND METHOD FOR USING AN ABSTRACT SYNTAX TREE TO ENCAPSULATE THE DESCRIPTIVE ASSERTIONS IN AN ANNOTATION BASED STANDARD INTO A CODE BASED LIBRARY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent application:

U.S. patent application Ser. No. 13/564,590, entitled "SYSTEM AND METHOD FOR USING A SHARED STANDARD EXPECTATION COMPUTATION LIBRARY TO IMPLEMENT COMPLIANCE TESTS WITH ANNOTATION BASED STANDARD," filed Aug. 1, 2012.

FIELD OF INVENTION

The present invention is generally related to computer systems and software, and is particularly related to implementing a compliance test.

BACKGROUND

Annotations, which refer to the metadata in the source code for attaching extra information, are widely used in JAVA Enterprise Edition (JEE). Many standard annotations have been defined in different JEE standards, most of which contains annotation based assertions. Some J2EE standards can even be pure annotation based standards, such as JSR181 and JSR250.

These are the generally areas that embodiments of the invention are intended to address.

SUMMARY

Described herein are systems and methods for supporting compliance tests with annotation based standards using an expectation library. The expectation library can convert one or more descriptive assertions into a structured data model, wherein the one or more descriptive assertions describe one or more annotations. Furthermore, the expectation library can parse a source file that contains the one or more annotations based on the structured data model. Additionally, the expectation library can obtain information related to the one or more annotations of the source file from the structured data model.

DETAILED DESCRIPTION

Described herein is a system and method for using a shared standard expectation computation library to implement compliance tests with various annotation based standards.

A computer programming environment, such as JAVA Enterprise Edition (JEE) environment, can involve many component standards. For example, a JEE certified application server (e.g. WebLogic Server provided by Oracle) is preferably compliant with various JEE standards. The content of these different standards can include a collection of assertions, each of which is a statement declaring an expected output for a specific input. An annotation based standard contains the definition of specific annotations and declares assertions based on those annotations.

Different compliance tests can be developed by the quality assurance (QA) team to verify whether target computer software complies with these standards. Standard compliance tests can verify every assertion included in these standards. For example, a JEE Application Server may be considered compliant with an assertion when the JEE Application Server behaves the same as the expectation described in the assertion. Furthermore, the JEE Application Server is considered to be compliant with a standard when it complies with all assertions included in the standard.

In accordance with an embodiment of the invention, the language based descriptive assertions in a standard can be encapsulated into a shared expectation computation library. One or more concrete tests can depend on the shared library to get the expectations required for testing annotation based standard compliance. This shared library can be a single point of truth within a product team. This shared library can shorten the learning path of testing developers, can cut down the possibility of making mistake when interpreting assertions of annotation based standards, and can allow the compliance tests to have a loose dependency on the standard and have a better tolerance of standard updates.

Figure 1:
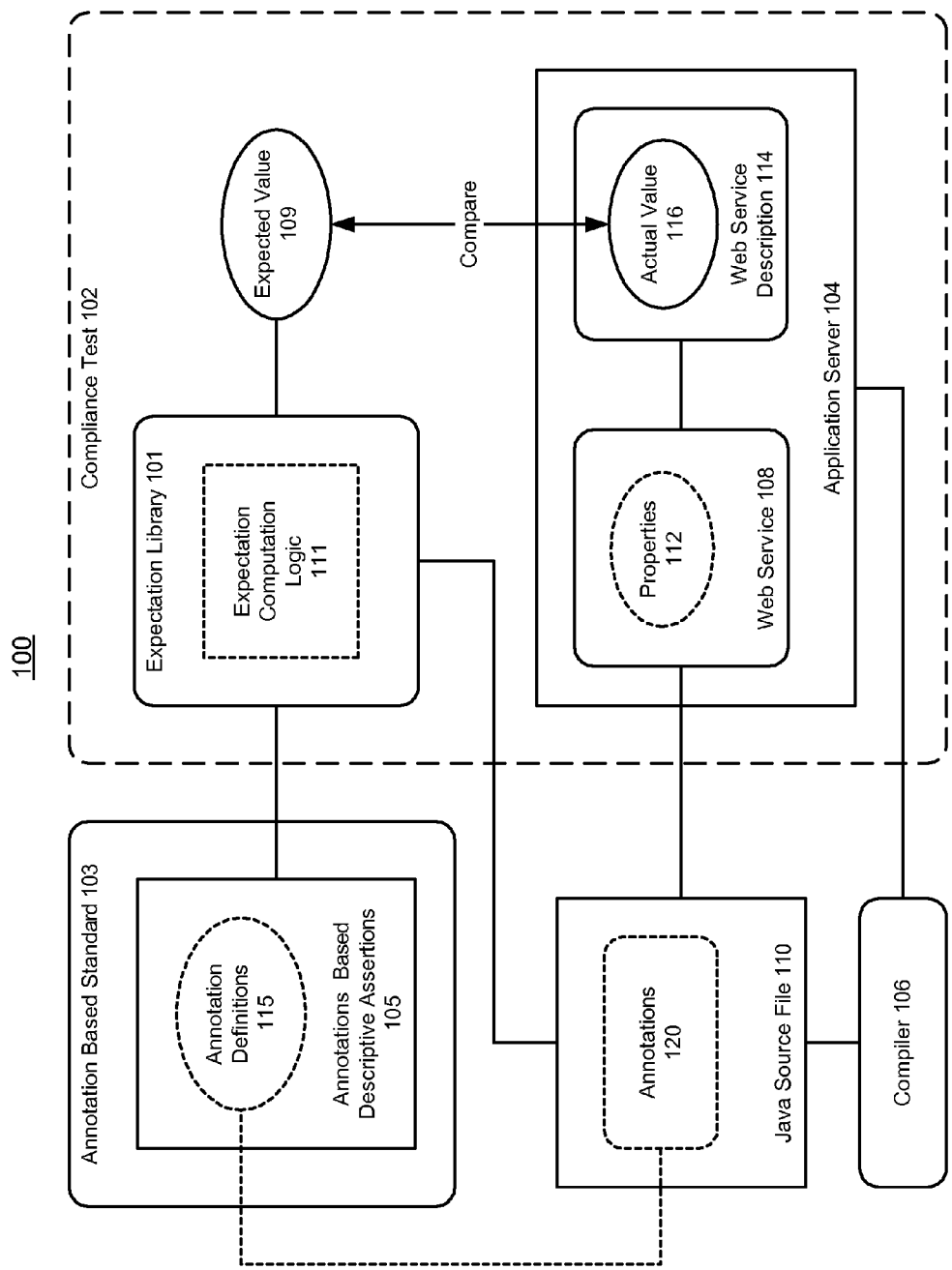
FIG. 1 shows an illustration of a testing environment that supports implementing a compliance test with an annotation based standard, in accordance with an embodiment of the invention.

FIG. 1 shows an illustration of a testing environment 100 that supports implementing a compliance test with an annotation based standard, in accordance with an embodiment of the invention. As shown in FIG. 1, the testing environment 100 can support performing a compliance test 102 with an annotation based standard 103. The compliance test 102 can evaluate a source file 110, e.g. via a compiler 106 associated with an application server 104.

The source file 110 can be in an object oriented programming language, e.g. JAVA programming language, that allows the usage of various annotations 120. The annotations 120 can be defined in an annotation based standard 103, which include annotation based descriptive assertions 105 that contain the annotation definitions 115.

Additionally, the compiler 106 can be used to compile the source file 110 into a web service 108. The description of the embodiments of the invention as following uses web service as an example for software applications, components, and services. It will be apparent to those skilled in the art that other types of software applications, components, and services, such as a web application and/or a J2EE component (e.g. an EJB bean), can be used, without limitation.

As shown in FIG. 1, the web service 108 can be deployed on the one or more applications servers 104 for accessing by different clients. Furthermore, the web service 108 can be associated or configured with one or more properties 112, which can be described in a web service description 114, e.g. a Web Services Description Language (WSDL) file. Then, a test developer can manually or programmably parse the web service description 114 in order to obtain the actual value 116 for the web service properties 112.

Furthermore, the annotation based assertions 105 can be converted into an expectation library 101, which is a model library that contains expectation computation logic 111. The expectation library 101 can be implemented using an object oriented programming language, e.g. JAVA programming language. Furthermore, the compliance test 102 can delegate the expectation computation task to the expectation library 101, which takes the source file 110 as an input and determine the expected value 109 for the web service properties 112.

Finally, a test developer can compare the expected value 109, computed using the expectation library 101, with the actual value 116, obtained via parsing the web service description 114, in order to determine whether the target source file 110 is compliant with the annotation based standard.

Figure 2:
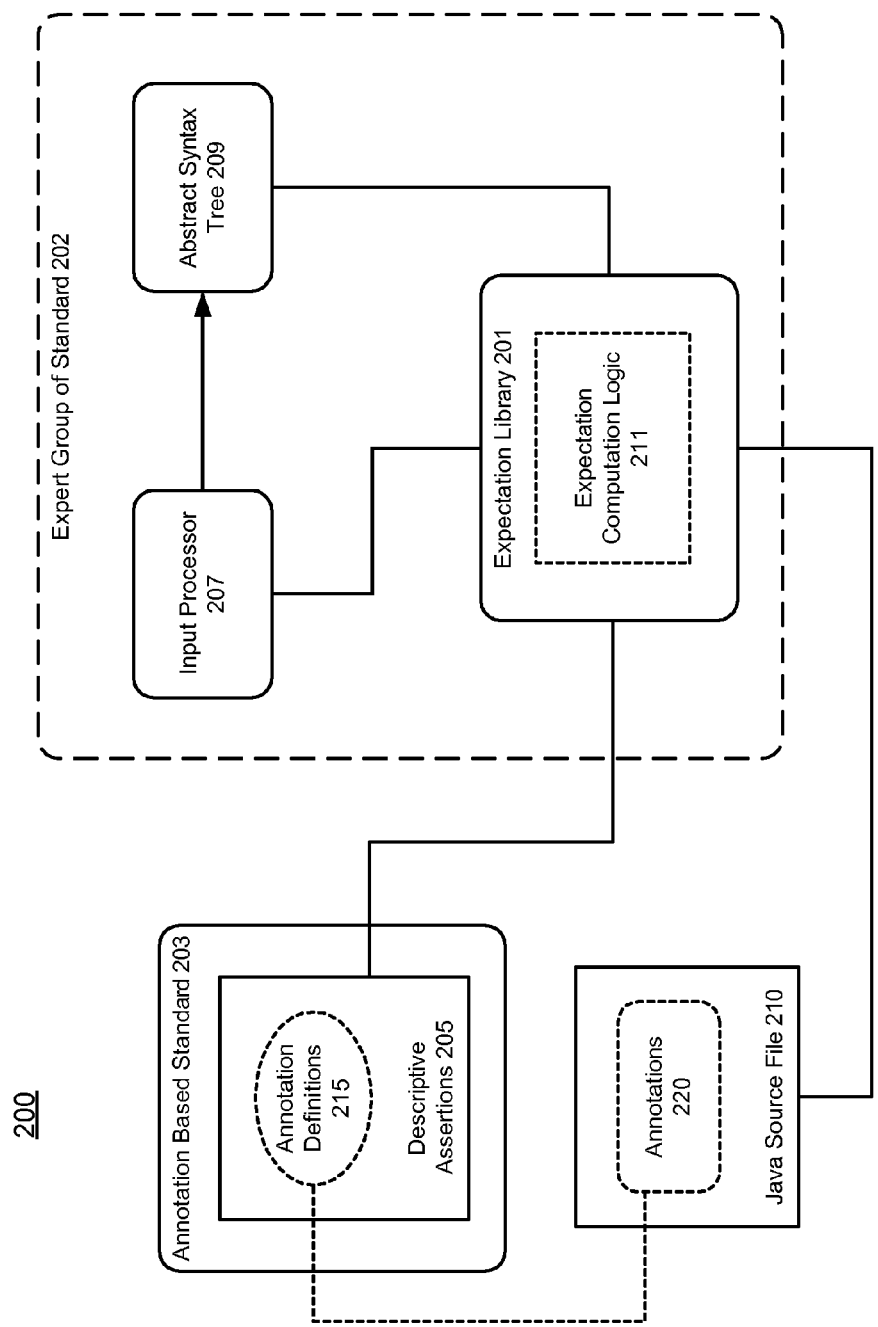
FIG. 2 shows an illustration of encapsulating descriptive assertions in an annotation based standard in a testing environment, in accordance with an embodiment of the invention.

FIG. 2 shows an illustration of encapsulating descriptive assertions in an annotation based standard in a testing environment 200, in accordance with an embodiment of the invention. As shown in FIG. 2, the testing environment 200 can provide an expectation library 201 in an expert group of standard 202. The expectation library 201 encapsulates expectation computation logic 211 described in an annotation based standard 203, e.g. an JEE annotation based standard. The annotation based standards 203 may contain one or more descriptive assertions 205 that include annotation definitions 215 for one or more annotations 220. These descriptive assertions 205 also provide restrictions on where and how the annotations 220 may or may not be used.

Furthermore, the expectation library 201 can provide a standard way to convert the descriptive assertions 205 into structured data model, e.g. an abstract syntax tree 209. For example, the expectation library 201 can use an input processor 207 to process the annotation based standard 203 and convert the one or more descriptive assertions 205 into the abstract syntax tree 209.

In accordance with an embodiment of the invention, the abstract syntax tree 209 can provide a set of standard methods for getting standard related information from the Java source file 210 in an object oriented way. For example, the expectation library 201 can take the Java source file 210 as input and parse the Java source file 210 based on the abstract syntax tree 209 according to the annotation based standards 203. The abstract syntax tree 209 can be used to validate the input Java source file 210 and obtain structured information from the input Java source file 210.

Thus, the abstract syntax tree 209 can be used as the starting point of the shared expectation library implementation, which makes the input processing transparent and allow the expectation library 201 to focus on encapsulating logic of the annotation based standard 203. Furthermore, the abstract syntax tree 209, which can be used in different programming language compilers, allows test developers to leverage various existing abstract syntax tree solutions in different programming language.

Figure 3:
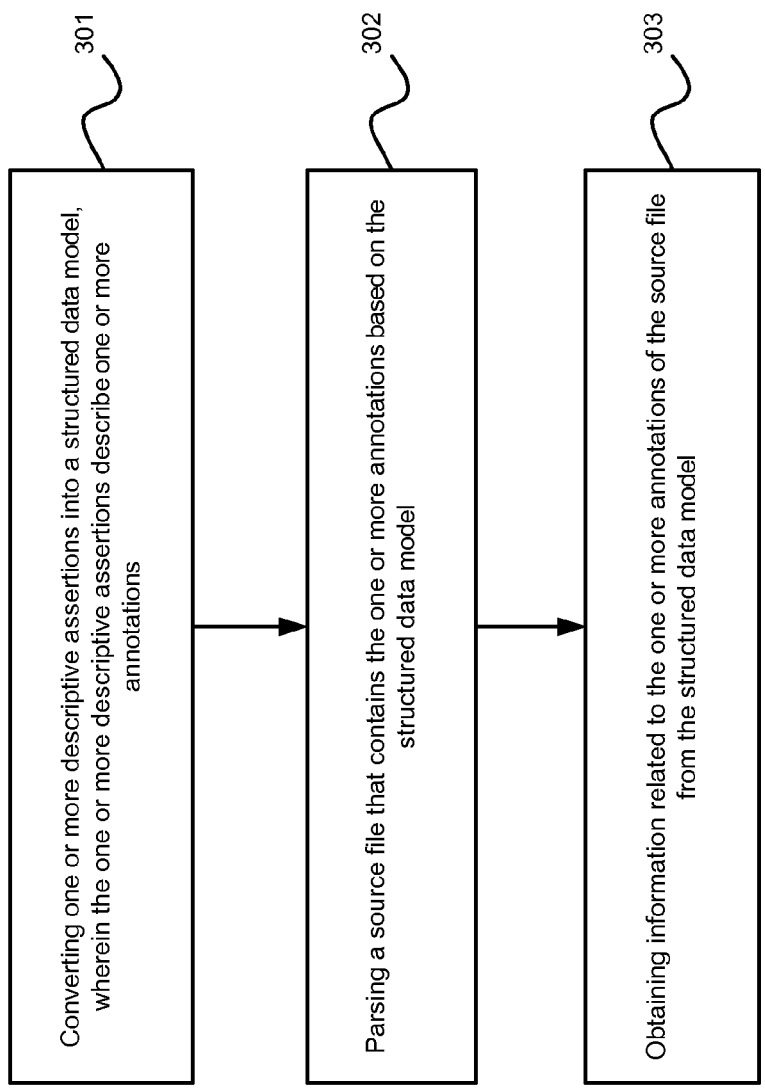
FIG. 3 illustrates an exemplary flow chart for supporting compliance tests using an expectation library, in accordance with an embodiment of the invention.

FIG. 3 illustrates an exemplary flow chart for supporting compliance tests using an expectation library, in accordance with an embodiment of the invention. As shown in FIG. 3, at step 301, the expectation library can convert one or more descriptive assertions into a structured data model, wherein the one or more descriptive assertions describe one or more annotations. Then, at step 302, the expectation library can parse a source file that contains the one or more annotations based on the structured data model. Finally, at step 303, the expectation library can obtain information related to the one or more annotations of the source file from the structured data model.

A JSR 181 Compliance Test Example

Figure 4:
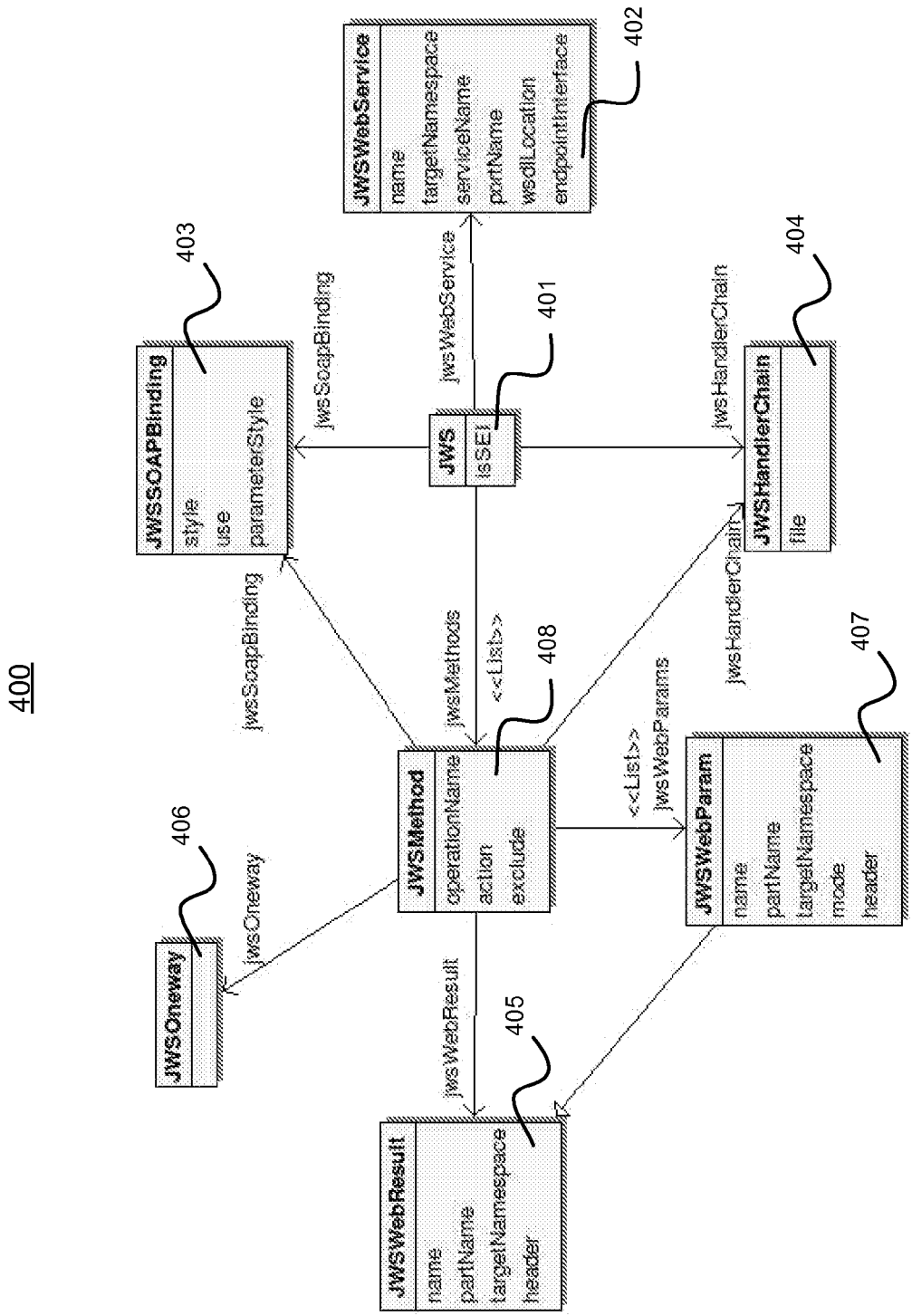
FIG. 4 shows an illustration of an exemplary class diagram that encapsulates an annotation based standard, in accordance with an embodiment of the invention.

FIG. 4 shows an illustration of an exemplary class diagram 400 that encapsulates an annotation based standard, in accordance with an embodiment of the invention. As shown in FIG. 4, the class diagram 400 can represent an abstract syntax tree for the JSR 181 standard, an annotation based standard. The class diagram 400 includes different classes 401-408 that can be used to encapsulate the expectation computation logic described in JSR 181.

The following Listing 1 is an exemplary pseudo code for implementing the JSR181 library based on the JSR181 abstract syntax tree as shown in FIG. 4.

Listing 1

```
public class JSR181StandardImpl {
    JWS jws;
    public JSR181StandardImpl(JWS jws) {
        this.jws = jws;
    }
    /*
    * Method for getting wsdl:portType value
    */
    public String getWsdlPortType( ) {
        JWSWebService jwsWebService = jws.getJwsWebService( );
        if(jwsWebService!=null && jwsWebService.getName( )!=null) {
            //Use the name attribute of @WebService for wsdl:portType
            return jwsWebService.getName( );
        }
        //Default use the class name for wsdl:portType.
        return jws.getOwnerClass( ).getName( );
    }
}
```

As shown in the above, the JSR181 library can encapsulate the JSR181 assertions using a JSR181 abstract syntax tree. For example, the JSR181 library can provide a getWsdlPortType( ) method for obtaining the value of a web service property, wsdl:portType. This method can be based on the following assertion in JSR181.

"For annotation javax.jws.WebService, the name member value must be used as the name of the wsdl:portType when mapped to WSDL 1.1, and the default value for name is simple name of the Java class or interface where this annotation is added."

Then, a compliance test can be performed using the JSR181 library. The following Listing 2 is an exemplary pseudo code for performing a compliance test using the JSR181 library, Listing 2

```
public class JSR181ConplianceTest {
    @Test
    public void testWsdlPortType( ) {
        String javaSource = "package com.abc;
            @WebService( name = "EchoService")
            public class EchoServiceImpl {
                @WebMethod
                public String echo(String input) {
                    return input;
```

-continued

Listing 2

```
    }
   }";
   JSR181StandardImpl standardImpl =
   new JSR181StandardImpl(javaSource);
   MyImpl myimpl = new MyImpl(javaSource);
   String expectedValue = standardImpl.getWsdlPortType( );
   String actualValue = myimpl.getWsdlPortType( );
   Assert.assertEquals(expectedValue,actualValue);//
  }
}
```

As shown in the above, the JSR181 library as implemented in Listing 1 can take a Java source file, e.g. a JavaSource string, as input. Then, the test can obtain an expected value for the web service property, wsdl:portType, using the getWsdlPortType( ) method provided. This expected value can be compared with an actual value obtained from the actual implementation for compliance testing purpose. Thus, using a JSR181 abstract syntax tree, the compliance test can be easily read and performed, and the detail of performing the JSR181 computation can be isolated.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for encapsulating an annotation based standard into an expectation library to support compliance tests, comprising:
   providing an expectation library in a testing environment operating on one or more microprocessors, wherein the expectation library includes an input processor, and a structured data model;
   encapsulating, based on the structured data model, expectation computation logic defined in an annotation based standard into the expectation library;
   converting, using the input processor, one or more descriptive assertions of the annotation based standard into the structured data model, wherein the one or more descriptive assertions describe one or more annotations; and
   encapsulating the converted descriptive assertions into the expectation library;
   wherein the expectation library operates to parse, based on the structured data model, a source file that contains the one or more annotations, and obtain information related to the one or more annotations from the structured data model for use in a compliance test.

2. The method of claim 1, wherein the structured data model includes a plurality of classes of an object oriented programming language.

3. The method of claim 1, wherein the structured data model is an abstract syntax tree.

4. The method of claim 1, wherein the source file is in a format of an object oriented programming language.

5. The method of claim 1, further comprising:
   compiling the source file into a software component or web service.

6. The method of claim 1, wherein the obtained information related to the one or more annotations is used to compute an expected value for the one or more properties associated with the software component or web service.

7. The method of claim 6, further comprising:
   determining whether an actual value of the one or more properties associated with the software component or web service is the same as the computed expected value.

8. The method of claim 1, further comprising:
   parsing another source file that contains the one or more annotations into another structured data model; and
   obtaining another information related to the one or more annotations from the another structured data model.

9. A system for encapsulating an annotation based standard into an expectation library to support compliance tests, comprising:
   one or more microprocessors;
   an expectation library running on the one or more microprocessors, wherein the expectation library includes an input processor and a structured data model, and operates to perform the steps of
      encapsulating, based on a structured data model, expectation computation logic defined in an annotation based standard into the expectation library,
      converting, using the input processor, one or more descriptive assertions of the annotation based standard into the structured data model, wherein the one or more descriptive assertions describe one or more annotations,
      encapsulating the converted descriptive assertions into the expectation library,
      parsing, based on the structured data model, a source file that contains the one or more annotations, and
      obtaining information related to the one or more annotations from the structured data model for use in a compliance test.

10. The system of claim 9, wherein the structured data model includes a plurality of classes of an object oriented programming language.

11. The system of claim 9, wherein the structured data model is an abstract syntax tree.

12. The system of claim 9, wherein the source file is in a format of an object oriented programming language.

13. The system of claim 9, wherein the source file is compiled into a software component or web service.

14. The system of claim 13, wherein the obtained information related to the one or more annotations is used by the expectation library to compute an expected value for the one or more properties associated with the software component or web service.

15. The system of claim 14, wherein the expectation library is used in a compliance test to determine whether an actual value of one or more properties associated with the software component or web service is the same as the computed expected value.

16. A non-transitory machine readable storage medium having instructions stored thereon that when executed cause a system to perform the steps comprising:
   providing an expectation library in a testing environment operating on one or more microprocessors, wherein the expectation library includes an input processor, and a structured data model;
   encapsulating, based on the structured data model, expectation computation logic defined in an annotation based standard into the expectation library;
   converting, using the input processor, one or more descriptive assertions of the annotation based standard into the structured data model, wherein the one or more descriptive assertions describe one or more annotations; and
   encapsulating the converted descriptive assertions into the expectation library;
   wherein the expectation library operates to parse, based on the structured data model, a source file that contains the one or more annotations, and obtain information related to the one or more annotations from the structured data model for use in a compliance test.

17. The non-transitory machine readable storage medium of claim 16, wherein the structured data model includes a plurality of classes of an object oriented programming language.

18. The non-transitory machine readable storage medium of claim 16, wherein the structured data model is an abstract syntax tree.

19. The non-transitory machine readable storage medium of claim 16, wherein the source file is in a format of an object oriented programming language.

20. The non-transitory machine readable storage medium of claim 16, wherein the obtained information related to the one or more annotations is used to compute an expected value for the one or more properties associated with the software component or web service.

* * * * *

UNITED STATES PATENT AND TRADEMARK OFFICE
CERTIFICATE OF CORRECTION

PATENT NO.        : 8,843,897 B2                                           Page 1 of 1
APPLICATION NO.   : 13/564602
DATED             : September 23, 2014
INVENTOR(S)       : Li It is certified that error appears in the above-identified patent and that said Letters Patent is hereby corrected as shown below:

In the Specification

In column 4, line 55, delete "library," and insert -- library. --, therefor.

In column 4, line 59, delete "Conpliance" and insert -- Compliance --, therefor.

Signed and Sealed this
Twenty-eighth Day of April, 2015

Michelle K. Lee
*Director of the United States Patent and Trademark Office*